US005898555A

United States Patent [19]

Katsumata et al.

[11] Patent Number: 5,898,555

[45] Date of Patent: Apr. 27, 1999

[54] OVERLOAD PROTECTOR WITH OVERCURRENT AND OVER TEMPERATURE PROTECTION

[75] Inventors: Hiromi Katsumata, Gotemba; Takashi Masuda, Susono, both of Japan

[73] Assignee: Texas Instruments Incorporated, Dallas, Tex.

[21] Appl. No.: 08/792,205

[22] Filed: Jan. 31, 1997

[30] Foreign Application Priority Data

Feb. 5, 1996 [JP] Japan .................................... 8-402071

[51] Int. Cl.[6] ........................................................ H02H 5/04

[52] U.S. Cl. ................................ 361/26; 361/105; 361/25

[58] Field of Search .................................. 361/23, 24, 25, 361/26, 103, 105; 307/112–141.4

[56] References Cited

U.S. PATENT DOCUMENTS 5,023,744 6/1991 Hofsass ...................................... 361/26
5,367,279 11/1994 Sakai ...................................... 337/104
5,497,286 3/1996 Shimada et al. ........................ 361/105
5,515,229 5/1996 Takeda .

*Primary Examiner*—Jeffrey Gaffin
*Assistant Examiner*—Kim Huynh
*Attorney, Agent, or Firm*—Russell E. Baumann; Richard L. Donaldson

[57] ABSTRACT

A motor protector (1) for use in an electrical circuit for supplying current to a motor (10) to be protected having two separate bimetallic disk actuated switches (4, 5) contained within the protector (1) electrically connected in series with each other and the current source (13) and motor (10). In one embodiment, one of the two switches (6) uses a two bimetallic disk design in which the disks have different temperature actuations and reset values for providing a fail-safe feature.

7 Claims, 5 Drawing Sheets

OVERLOAD PROTECTOR WITH OVERCURRENT AND OVER TEMPERATURE PROTECTION

FIELD OF THE INVENTION

This invention relates to an overload protection device for protecting electric devices from overcurrent conditions, over heating and the like.

BACKGROUND OF THE INVENTION

In the prior art, overload protectors have been used with compressor motors in air conditioners or the like for the protection of the motor by sensing any abnormal heat generation or high electrical current situation. Such a situation arises often when the motor is over worked or the rotor is in a locked position.

FIG. 6 shows such a prior art motor protector 101 which has an adjusting screw 103 in the shape of a column at the center of casing 102 made from an electrically insulating material such as a plastic resin. A cylindrical bimetal disk 104 is attached at the top of adjusting screw 103 with movable contacts 105 and 106 provided at both edges of bimetal disk 104.

Mounted in the bottom of casing 102 are two fixed contacts 107 and 108 positioned to be contacted by movable contacts 105 and 106. Additionally, fixed contact 107 is connected to a heating element 109. Motor protector 101 is connected in the electrical circuit that drives a motor (not shown) so that the current flow to a connecting terminal 110 is from fixed contact 108 through bimetallic disk 104, fixed contact 107 and heater 109.

In a case where the rotor of a motor is locked or the motor is under excessive load, the ambient temperature rises and an electrical current larger than ordinary flows through bimetallic 104, with a result that, as shown in FIG. 6, the bimetallic disk reaches its actuation or snap temperature and snaps over center thereby moving contacts 105 and 106 out of contact with fixed contacts 107 and 108. Accordingly, the supply of electrical current to the motor is cut off and the motor is thus protected. Such protectors have been used widely, but it is always desirable to have an improved device. This fact is especially true for the protection of motors of compressors used in air conditioners, or the like, to better protect in the instances of leakage of cooling gas, or in the case of "end of life" failure of the device with contact welding between the movable and stationary contacts.

SUMMARY OF THE INVENTION

Accordingly, an object of the present invention is to provide a motor protector for compressors that will detect restrictions placed on motor rotor movement or overload conditions and additionally leakage of cooling gases.

Another object of this invention is to provide a motor protector that has a long life in service and can provide safety even upon contact welding in the device.

Accordingly, a motor protector of the present invention for connection in a circuit with an electrical source of current that drives a motor comprises a housing, a first switch contained in said housing which opens and closes dependent upon the amount of current flowing in said circuit and the temperature surrounding said first switch, and a second switch contained in said housing which opens and closes dependent only upon the temperature surrounding said second switch, said first and second switches electrically connected in series with each other and said electrical source of current and said motor to be protected.

Further, a motor protector according to this invention uses bimetal members to cause the opening and closing of the respective switches.

Still further, a motor protector according to this invention uses two bimetallic members to cause the opening and closing of one of the switches to form a fail-safe feature.

BRIEF DESCRIPTION OF THE DRAWINGS

Other objects, advantages and details of the motor protection device of this invention appear in the following detailed description of the preferred embodiments of the invention, the detailed description referring to the drawings in which.

DESCRIPTION OF THE PREFERRED EMBODIMENTS

Figure 1A:
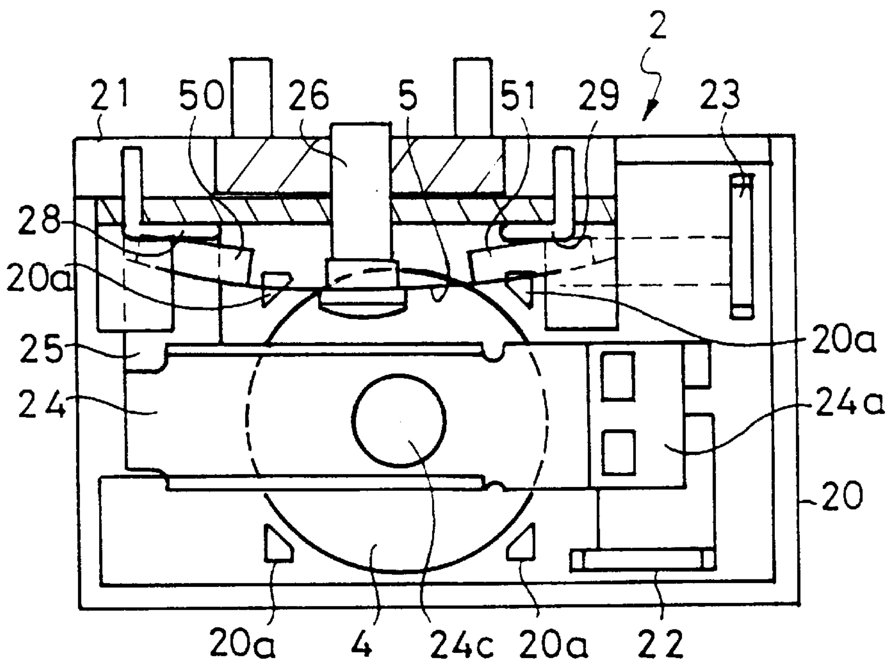
FIG. 1 A shows a partly cut plan view of a protection device according to this invention.
FIG. 1B shows a partly cut front view of a protection device according to this invention.
Figure 1B:
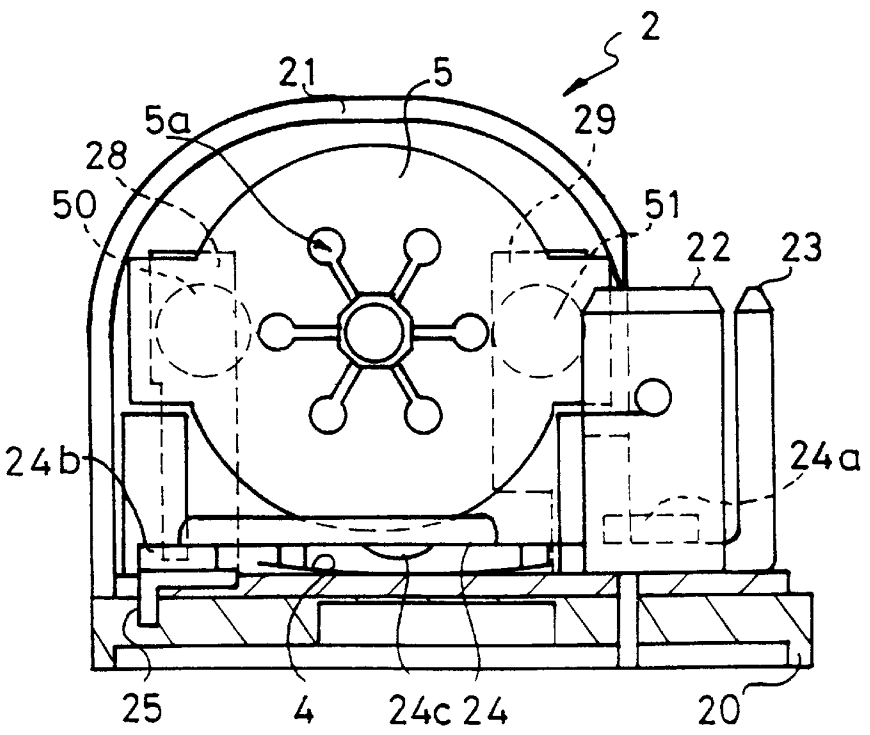
Figure 2:
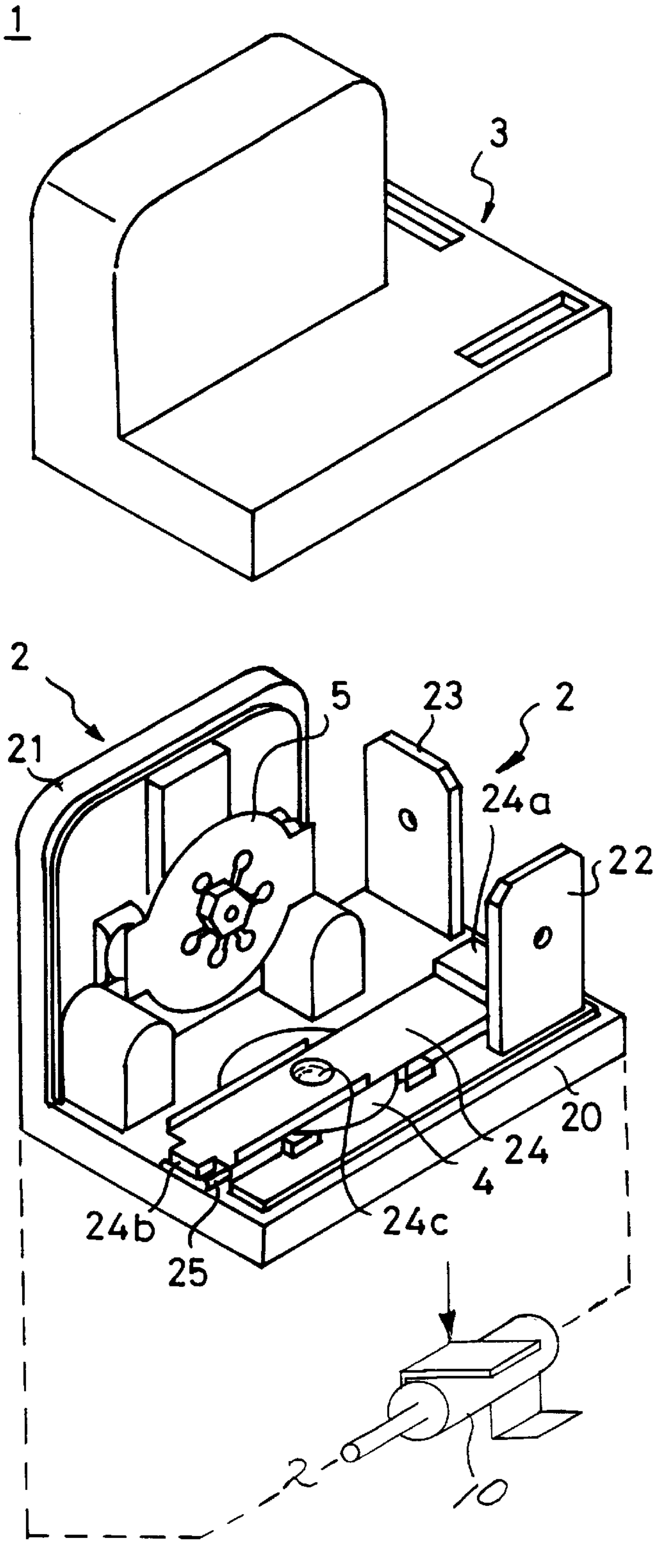
FIG. 2 shows an exploded oblique view of the motor protector of FIGS. 1 and 2.

FIGS. 1 and 2 show a first embodiment of a motor protector 1 according to this invention typically for use in a compressor for an air conditioner or the like being mounted on the main wall of the main body of the compressor.

Motor protector 1 has a housing with a base part 2 and a casing 3 with the base part 2 and casing 3 being made typically of a resinous material or the like. The base and the casing are constructed in such a way that they can be freely attached or detached with each other.

Base part 2 has a bottom wall 20 which will be installed on the surface of a motor 10 for good direct thermal contact therewith as will be described later. Additionally, base part 2 has a side wall 21 extending vertically upward from bottom wall 20 and typically these walls are formed as an integral piece. Two bimetal disk elements 4 and 5 are mounted in base 2 with bimetal element 4 adjacent bottom wall 20 and bimetal element 5 adjacent side wall 21.

Two connecting terminals 22 and 23 made of metal are mounted in an upstanding position at the perimeter of bottom wall 20 and extend through casing 3. Connecting terminal 22 is connected to a movable metallic arm 24 of a generally oblong shape by a mounting portion 24*a* at one end of arm 24. At the opposite end of arm 24 a contact 24*b* is provided which is biased downward to contact a connecting terminal 25 that is provided in bottom wall 20. Positioned between mounting portion 24*a* and contact 24*b* on arm 24 is a protrusion 24*c* facing bottom wall 20. Protrusion 24*c* can be formed by many processes as are know in the art.

As is shown in FIG. 1B, bimetallic disk 4 is positioned between movable arm 24 and bottom wall 20. The bimetal disk has a generally circular shape and is formed to have a dished configuration with its convex surface facing bottom wall 20 in an unheated normal state.

As is known in the art, bimetal disk 4 is made by bonding two metal materials together with different coefficients of thermal expansion. Accordingly, when the bimetal disk is formed in a prescribed dish shape, it will snap over center at a prescribed temperature such as 120 degrees centigrade and will return (snap) back to its original configuration at a lower temperature such as 60 degrees centigrade.

In accordance with the present invention, bimetallic disk 4 is not fixed to bottom part 20 and is only generally held in place by four positioning posts 20a.

At approximately the center of side wall 21, an adjustment screw is inserted and bimetal disk 5 is installed thereon by an attachment means 27 such as a nut at the tip of adjustment screw 26. Bimetal disk 5 has dished shape like bimetal disk 4 but with a larger area. Bimetal disk 5 is positioned in such a manner as to face side wall 21. Like bimetal disk 4, bimetal disk is made by joining together two different metals whose thermal expansion rates are different and then forming it into a preselected dished configuration. By way of example, bimetal disk 5 snaps over center at a temperature about 165 degrees centigrade and returns to its original position when the temperature is reduced to 80 degrees centigrade. It is to be noted that in a preferred embodiment of this invention, bimetal disks 4 and 5 actuate at different temperatures.

As is shown in FIG. 1 (B), a plurality of cut-out portions 5*a* are made in disk 5 for dispersing the stresses that are produced due to the "snapping" action of the disk. At two points on the edge of the concave surface of bimetal 5, two movable contacts 50 and 51 are positioned to be able to contact two fixed contacts 28 and 29 which are mounted in side wall 21. Adjustment screw 26 allows for the calibration and positioning of movable contacts 50 and 51 to engage fixed contacts 28 and 29.

Fixed contact 28 is electrically connected to the connecting terminal 25 that is mounted on bottom wall 20 and the other fixed contact 29 is connected to terminal 23 that is likewise mounted on bottom wall 20.

Figure 3:
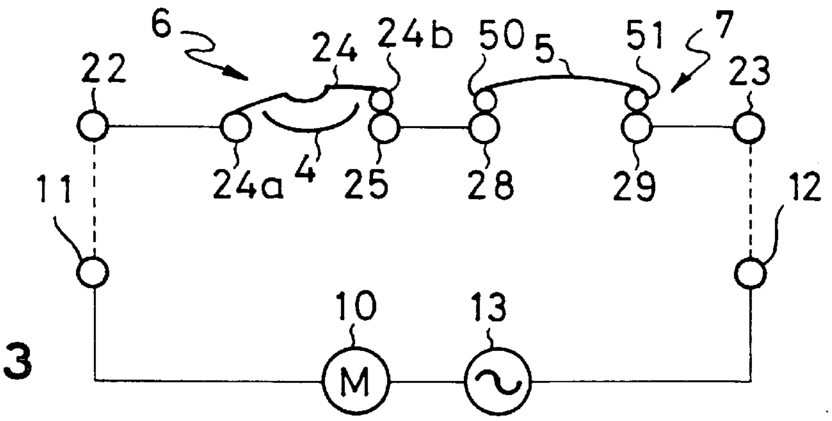
FIG. 3 is a circuit showing the circuit construction of the motor protector of this invention.

FIG. 3 shows a circuit with motor protector 1 used therein. As is shown in FIG. 3, two switches 6 and 7 which are opened or closed due to the action of bimetal disk 4 and 5 respectively are electrically connected in series with each other and a current source 13 and a motor 10. That is, terminal 11 of motor 10 and connecting terminal 22 are electrically connected in series as are movable contact 24*b* on arm 24 and connecting terminal 25 on bottom wall 20. As stated above, bimetal disk 4 controls the opening and closing of switch 6 through controlling the movement of movable contact 24*b*.

Further, fixed contact 28 that is electrically connected with connecting terminal 25 is electrically connected with movable contact 50 mounted on bimetal disk 5 which is at the same time electrically connected to movable contact 51 which in turn is connected to fixed contact 29. Bimetal disk 5 controls the opening and closing of switch 7 through the controlling of the movement of movable contacts 50 and 51. Finally, connecting terminal 23 is electrically connected to both fixed contact 29 and a connecting terminal 12 of motor 10. Accordingly, protector 1 can supply protection to motor 10 by the control of switches 6 and 7 in the protector.

The operation of protector 1 in the circuit will be explained in detail below.

First, connecting terminals 22 and 23 are connected in series with the electric source of current 13 for the motor 10. In the case of the motor 10 that runs a compressor (not shown in the drawings), the bimetal disk 4 typically is located in the neighborhood of the pin of the compressor (source of heat) to make it easier to detect the heat.

Figure 4A:
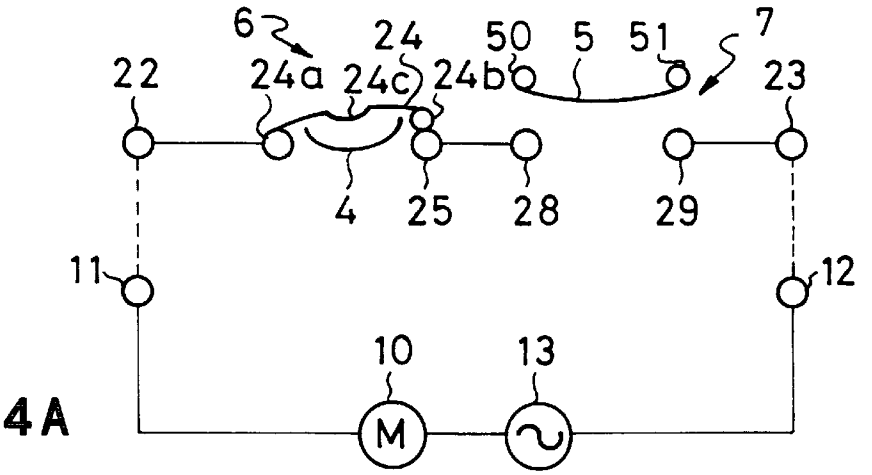
FIGS. 4A and 4B are explanatory figures showing the operation of the circuit of FIG. 3.
Figure 4B:
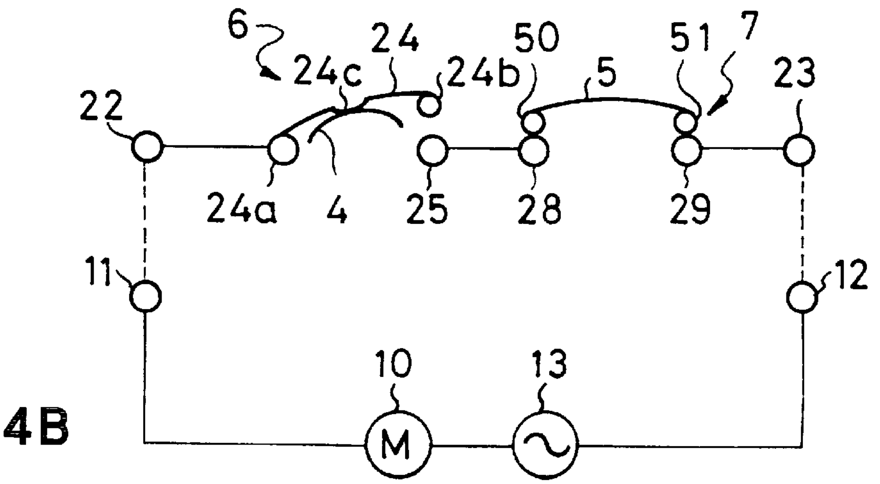

FIGS. 4 (A) and (B) are the explanatory figures showing the action involved in which FIG. 4 (A) shows the state in which the switch 7 is open and FIG. 4 (B) shows the state in which the switch 6 is open.

In the case where the rotor in motor 1 0 has been restricted in some manner or an excessive load has been placed on the motor 10, bimetal disk 5 snaps over center when the pre-determined conditions have been met due to an increase in the electric current that flows through the bimetal disk 5 and the corresponding elevation of the temperature. This results in movable contacts 50 and 51 mounted on bimetal disk 5 being separated from fixed contacts 28 and 29. As a result of this action, the electric source of current of the motor 10 is cut off and the motor 10 stops running.

Protector 1 will also supply protection by the action of bimetal disk 4 reacting solely to the elevation of the temperature of the heat source and not being a current carrying member of the circuit (see FIGS. 3 and 4). As noted above, bimetal disk 4 is positioned to closely reflect the temperature of the compressor.

Accordingly, when there is a leak of the compressor gas, bimetal disk 4 snaps over center when the temperature reaches a predetermined temperature such as 120 degrees centigrade. As a result of this action, the surface of bimetal disk 4 contacts protrusion 24*c* on the movable arm 24 so as to move arm 24 and movable contact 24*b* out of contact with fixed contact 25 thereby removing supply of current for motor 10.

In accordance with this invention, motor protector 1 will stop and protect the motor 10 not only upon the occurrence of a rotor restriction and excess load on motor 10 but also at the time of a leakage of the gas from the compressor. This dual function of protector 1 removes the need to provide a separate thermostat for the protection of the motor 10 as was often used heretofore.

In According to the motor protector of the present invention, there are provided two bimetal discs which lessens the number of actuations of either one of the bimetal disks with the consequence that the life of the motor protector can be increased thereby providing more reliability.

The problem of contact welding can potentially still be a problem which is further addressed in a second embodiment of the present invention described below in which those parts which correspond to those in the first embodiment will be given the same number designations.

Figure 5A:
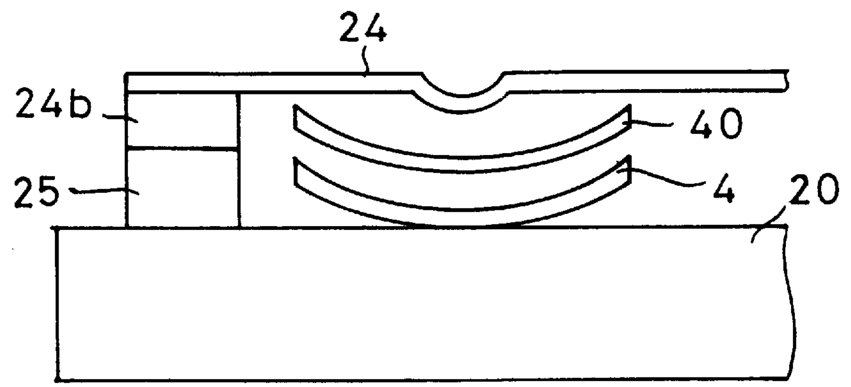
FIGS. 5A–5C are explanatory figures showing the essential parts of another embodiment of a motor protector according to this invention with FIGS. 5 (A) showing the case where both of the bimetal elements are in their normal state, FIG. 5 (B) showing the case where both of the bimetal elements are in their inverted state and FIG. 5 (C) showing the case where one of the bimetal elements is in the inverted state.
Figure 5B:
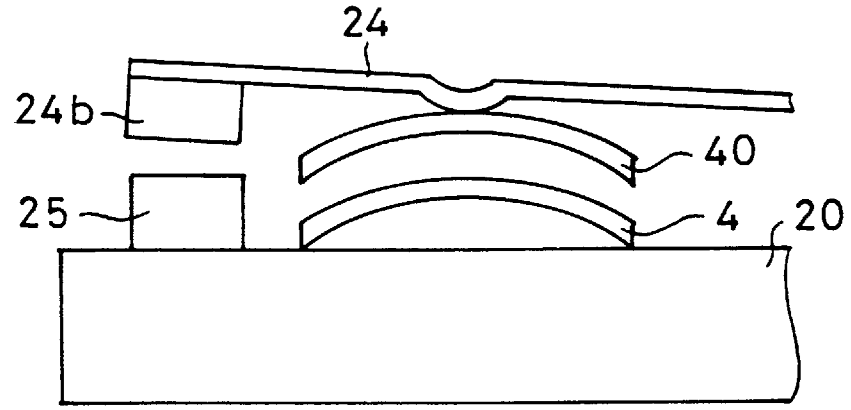
Figure 5C:
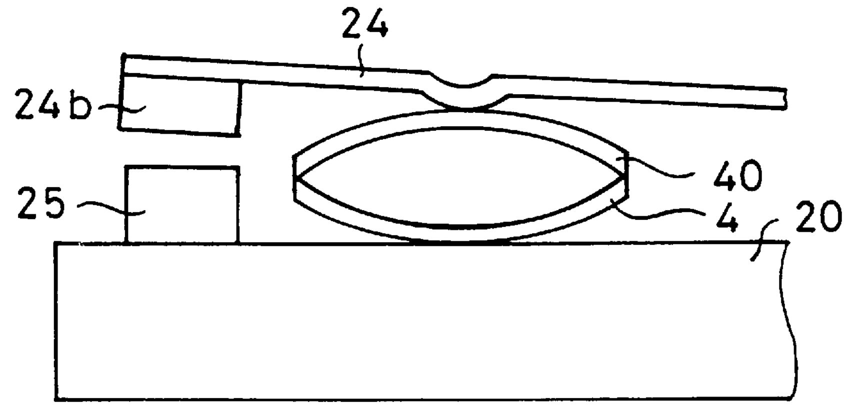
Figure 6:
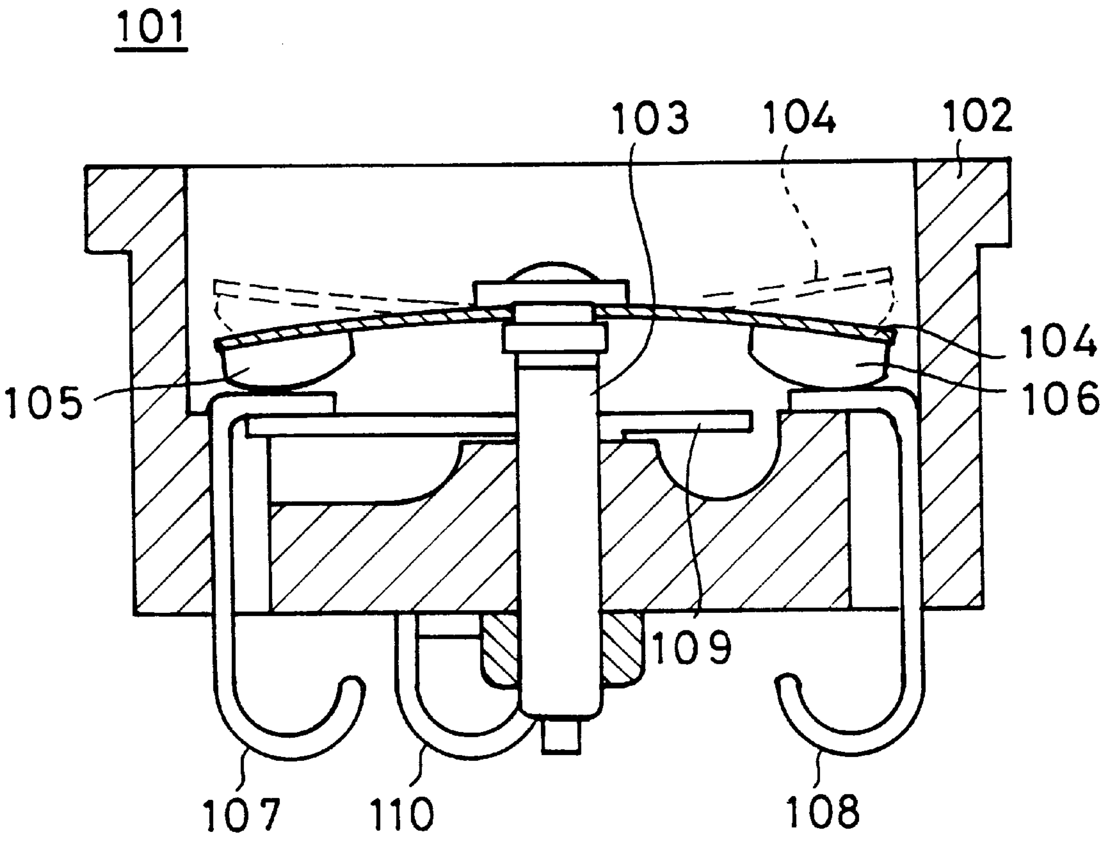
PRIOR ART FIG. 6
FIG. 6 shows a cross-sectional view of a motor protector according to the prior art.

As shown in FIG. 5, the motor protector of the second embodiment includes a fail-safe bimetal disk 40 in addition to the bimetal disk 4 positioned between the bottom wall 20 and the movable arm 24. Both of these bimetal disks 4 and 40 are not current carrying members of the circuit (see FIGS. 3 and 4). As shown in FIG. 5 (A), bimetal disk 40 for fail-safe purposes is superimposed on the bimetal disk 4.

This fail-safe bimetal disk 40 has a higher actuation temperature than bimetal disk 4 for pushing up movable arm 24 and a lower reset temperature for returning to the original state. This reset temperature is lower than the temperature inside the motor protector 1 at the time of the normal operation of the motor 10.

For example, where the actuator temperature of the bimetal disk 4 is 120 degrees centigrade and the temperature at which it resets and returns to the original state is 60 degrees centigrade, bimetal disk 40 will have a actuation temperature of 125 degrees centigrade and a reset temperature of–30 degrees centigrade.

In a motor protector as described in this embodiment, fail-safe bimetal disk 40 has a snap or actuation temperature which is higher than the bimetal disk 4 and, moreover, the bimetal disk 4 is closer to the heat source (for example, bottom wall 20 is mounted on motor 10 as diagrammatically shown in FIG. 2) with a result the bimetal disk 40 does not snap in normal operation. Should there be welding between movable contacts 50 and 51 on bimetal disk 5 and the fixed contacts 28 and 29, the temperature of the motor 10 will rise and, at the point where the temperature has exceeded 120 degrees centigrade, the bimetal disk 4 will snap over center and the electric source of current will be cut off. However, the temperature can still rise due to the residual heat for some time after the cut-off of current so that fail-safe bimetal disk 40 will snap over center at the time where the temperature has exceeded 125 degrees centigrade (see FIG. 5 (B)). Thereafter, along with the drop of the temperature of the motor 10, bimetal disk 4 resets and is restored to the original state (see FIG. 5 (C) ). Bimetal disk 40, however, does not return to its original state as the temperature at which it resets takes place at–30 degrees centigrade which is lower than the temperature inside the motor protector 1 during the normal operation of the motor 10.

Accordingly, even when movable contacts 50 and 51 of the bimetal disk 5 and the fixed contacts 28 and 29 are fused together, electricity will not be provided to motor 10. Because of this fact, the motor protector protects against this dangerous state.

Since the other construction and functional effect are the same as those described in connection with the first embodiment, no further detailed explanation will be given.

In accordance with this invention, it is desirable that the bimetal disk 5 is positioned in such a way as to be further separated from the heat source of the compressor than bimetal disk 4. Because of this fact, it becomes possible to reduce the sensitivity of the bimetal that opens or closes in conformity with the ambient temperature.

In accordance with the present invention, the motor protector comprises a first switch that opens or closes in conformity with the size of the electric current that flows and the temperature of the environment surrounding said first switch and a second switch that opens or closes solely in conformity with the temperature of the environment surrounding said second switch. The switches are connected in series with the electric source of current of the motor which is being protected. This motor protector provides protection even in the case of a temperature rise in the environment such as in the leakage of cooling gas in a compressor.

Also, the present invention provides for the two switches to have actuation temperatures that are different in an over-lapping manner and additionally, at least one of the two switches can include a fail-safe feature.

Although the above embodiment has been describes as a protective device which is suitable for the protection of the motor of a compressor, such overload protection device of this invention can also be used for the protection of other electric machines and electric apparatus.

Accordingly, it should be understood that although particular embodiments of this invention have been described by way of illustrating the invention, the invention includes all modifications and equivalencies of the disclosed embodiments falling within the scope of the appended claims.

We claim:

1. A motor protector for connection in an electrical circuit that drives a motor comprising a housing, a first switch contained in said housing which opens and closes dependent upon the amount of current flowing in said circuit and the temperature surrounding said first switch, and a second switch contained in said housing comprising first and second bimetal members which open and close said second switch dependent only upon the temperature surrounding said second switch, said first bimetal member for normally opening and closing the second switch and said second bimetal member, positioned further away from a heat source associated with said motor than said first bimetal member, having a higher preselected actuation temperature than said first bimetal member for opening the second switch and a lower preselected actuation temperature than said first member and the ambient temperature inside said motor protector during normal operation for closing said second switch thereby providing a fail-safe feature, said first and second switches electrically connected in series with each other and said electrical source of current and said motor to be protected.

2. A motor protector as described in claim 1 wherein said first switch uses a bimetal member to cause the opening and closing of the respective switches.

3. A motor protector as described in claim 2 wherein the bimetal members of the first and second switches have preselected activation temperatures for opening and closing said first and second switches and these activation temperatures are not the same.

4. A motor protector as described in claim 1 wherein said first member has an opening temperature of about 120 degrees centigrade and a closing temperature of about 60 degrees centigrade and said bimetal second member has an opening temperature of about 125 degrees centigrade and a closing temperature of about –30 degrees centigrade.

5. A motor protector for connection in an electrical circuit that drives a motor comprising a housing, a first switch contained in said housing including a first bimetal actuation member for opening and closing said first switch dependent upon the amount of current flowing in said circuit and the temperature surrounding said first switch, and a second switch contained in said housing apart from said first switch including at least one bimetal actuation member for opening and closing said second switch, said at least one bimetal member not being a current carrying member of said electrical circuit thereby being dependent for actuation only upon the temperature surrounding said at least one bimetal member and not also by the current flowing through the at least one bimetal member, said first and second switches electrically connected in series with each other and said electrical source of current and said motor to be protected.

6. A motor protector as described in claim 5 wherein said at least one bimetal member is two bimetal members with a first bimetal member for normally opening and closing the second switch and a second bimetal member, superimposed on said first bimetal member positioned further away from a heat source associated with said motor, having a higher preselected actuation temperature than said first bimetal member for opening the second switch and a lower preselected actuation temperature than said first bimetal member and the ambient temperature inside said motor protector during normal operation for closing said second switch thereby providing a fail-safe feature.

7. A motor protector as described in claim 6 wherein said first member has an opening temperature of about 120 degrees centigrade and a closing temperature of about 60 degrees centigrade and said second member has an opening temperature of about 125 degrees centigrade and a closing temperature of about −30 degrees centigrade.

* * * * *